(12) United States Patent
Simms et al.

(10) Patent No.: US 11,550,826 B2
(45) Date of Patent: *Jan. 10, 2023

(54) METHOD AND SYSTEM FOR GENERATING A GEOCODE TRIE AND FACILITATING REVERSE GEOCODE LOOKUPS

(71) Applicant: Twitter, Inc., San Francisco, CA (US)

(72) Inventors: Jonathan D. Simms, Woodmere, NY (US); Dale Harrison, New York, NY (US); Raghav Chandra, San Francisco, CA (US); Guy Dickinson, New York, NY (US)

(73) Assignee: Twitter, Inc., San Francisco, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/526,826

(22) Filed: Jul. 30, 2019

(65) Prior Publication Data

US 2020/0026721 A1 Jan. 23, 2020

Related U.S. Application Data

(63) Continuation of application No. 14/214,617, filed on Mar. 14, 2014, now Pat. No. 10,366,113.

(60) Provisional application No. 61/802,162, filed on Mar. 15, 2013.

(51) Int. Cl.
*G06F 16/00* (2019.01)
*G06F 16/29* (2019.01)

(52) U.S. Cl.
CPC .................................... *G06F 16/29* (2019.01)

(58) Field of Classification Search
CPC ... G06F 16/29; G06F 21/6245; G06F 21/6218
USPC .......................................................... 707/769
See application file for complete search history.

(56) References Cited

U.S. PATENT DOCUMENTS

| | | | | |
|---|---|---|---|---|
| 8,538,679 B1* | 9/2013 | Takyar | ................... | G01C 21/00 455/457 |
| 8,792,917 B2* | 7/2014 | Huang | ................... | G01S 5/0257 455/457 |
| 9,002,859 B1* | 4/2015 | Ward | ....................... | G06F 40/18 707/754 |
| 9,171,054 B1* | 10/2015 | Ward | .................. | G06F 16/2246 |
| 9,710,485 B2* | 7/2017 | Xu | ........................... | G06F 16/29 |
| 10,474,794 B2* | 11/2019 | Patton | ................. | G06F 21/6245 |
| 10,824,169 B1* | 11/2020 | Patton | ................. | G06F 21/6218 |
| 2002/0035605 A1* | 3/2002 | McDowell | ............ | H04L 69/329 709/206 |

(Continued)

OTHER PUBLICATIONS

GeoTrie—A scalable architecture for location-temporal range queries over massive geotagged data sets, Cortes et al., IEEE (Year: 2016).*

*Primary Examiner* — Jean M Corrielus
(74) *Attorney, Agent, or Firm* — Nixon & Vanderhye, P.C.

(57) ABSTRACT

A method and system generates a model of a geographic area for use in identifying locations of the geographic area. A set of variably sized tiles is defined for each of a set of overlapping geometries in the geographic area. Each of the variably sized tiles is defined by a geohash, where the size of the tile is dependent on a granularity of the geohash. A geocode trie structure representing the variably sized tiles can be constructed and used to map one or more provided location coordinates to at least one of the geometries represented by the tiles.

19 Claims, 15 Drawing Sheets

(56) References Cited

U.S. PATENT DOCUMENTS

| | | | | |
|---|---|---|---|---|
| 2010/0104174 A1* | 4/2010 | Rohlf | ............ | G06F 16/29 |
| | | | | 382/154 |
| 2011/0302194 A1* | 12/2011 | Gonzalez | ............ | G06F 16/29 |
| | | | | 707/769 |
| 2012/0173500 A1* | 7/2012 | Chakrabarti | ...... | G06F 16/24578 |
| | | | | 707/706 |
| 2012/0226889 A1* | 9/2012 | Merriman | ............ | G06F 16/2264 |
| | | | | 711/216 |
| 2012/0322561 A1* | 12/2012 | Kohlhoff | ............ | A63F 13/216 |
| | | | | 463/42 |
| 2013/0196692 A1* | 8/2013 | Huang | ............ | H04W 4/18 |
| | | | | 455/457 |
| 2014/0258280 A1* | 9/2014 | Wilson | ............ | G06F 16/29 |
| | | | | 707/724 |
| 2016/0103858 A1* | 4/2016 | Katz | ............ | G06F 16/9027 |
| | | | | 707/797 |

\* cited by examiner

METHOD AND SYSTEM FOR GENERATING A GEOCODE TRIE AND FACILITATING REVERSE GEOCODE LOOKUPS

This application is a continuation of U.S. application Ser. No. 14/214,617, filed Mar. 14, 2014, now U.S. Pat. No. 10,366,113, which claims the benefit of U.S. provisional application No. 61/802,162, filed Mar. 15, 2013. The contents of each of these applications and patents are incorporated herein in their entirety.

BACKGROUND

The present disclosure relates generally to location determination, and more particularly to generating and using a geocode trie to determine a location based on a geohash generated from location coordinates.

Traditional solutions for reverse geocoding have involved bounding box geometries with various packing optimizations. For example, a QuadTree structure can be used to represent non-overlapping geometries. In situations where overlapping geometries exist or which require minimum bound rectangles to be used, the QuadTree method returns multiple geometries in response to a single coordinate input. As a result, the system must solve what is commonly referred to as the "point-in-polygon" problem of matching to a single geometry. Various different solutions to this problem have been proposed (e.g., ray casting, matrix algebra), all leading to substantial inefficiency and resource requirements.

Complicating the matter, programming languages with garbage collection functionality (e.g., Java) are worse suited for resource intensive calculations. Specifically, the large number of dynamically allocated objects required in the computation can lead to long periods of garbage collection overhead and result in a system with high latency and low throughput characteristics.

SUMMARY

In general, in one aspect, the invention relates to a method for facilitating reverse geocode lookups comprising identifying a geographic area comprising a set of overlapping geometries. A set of variably sized tile representing each of the overlapping geometries is created, wherein each tile of the set of variably sized tiles is defined by a geohash value, and wherein a size of each tile of the set of variably sized tiles is dependent on a granularity of the geohash value. A geocode trie structure representing the set of variably sized tiles is constructed and the geocode trie structure is used to perform a reverse geocode lookup based on a geohash input value.

In general, in one aspect, the invention relates to a method for facilitating reverse geocode lookups, comprising receiving a reverse geocode lookup request identifying a location coordinate. A geohash value based at least on the location coordinate is created. A geocode trie structure is traversed based on the geohash value. A most granular tile of the geocode trie structure matching the geohash value is identified and an identifier of the most granular tile is provided in response to the request.

In general, in one aspect, the invention relates to a system for facilitating reverse geocode lookups, comprising a processor and a geocode lookup engine. The geocode lookup engine is configured to receive a reverse geocode lookup request identifying a location coordinate. A geohash value is generated based at least on the location coordinate. A geocode trie structure is traversed based on the geohash value. A most granular tile of the geocode trie structure matching the geohash value is identified. An identifier of the most granular tile is provided in response to the request.

Other aspects of the invention will be apparent from the following description and appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
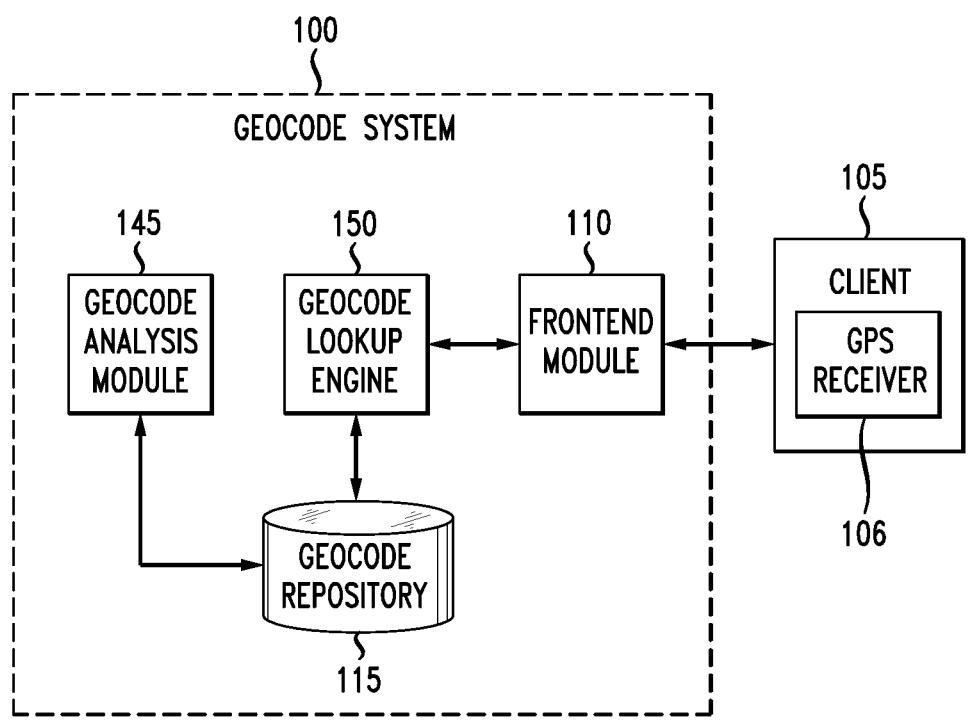
FIG. 1 shows a schematic diagram of a system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating a model of a geographic area. A set of variably sized tiles is defined for each of a set of overlapping geometries in the geographic area. Each of the variably sized tiles is defined by a geohash, where the size of the tile is dependent on a granularity of the geohash. A geocode trie structure representing the variably sized tiles can be constructed and used to map one or more provided location coordinates to at least one of the geometries represented by the tiles.

FIG. 1 shows a geocode system (100) and a client (105) in accordance with one or more embodiments of the invention. As shown in FIG. 1, the client (105) includes a global positioning system (GPS) receiver (106). As also shown in FIG. 1, the geocode system (100) has multiple components including a geocode analysis module (145), a geocode lookup engine (150), a geocode repository (115), and a frontend module (110).

Various components of the geocode system (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the geocode analysis module (145) includes functionality to identify a geographic area including a set of overlapping geometries. For example, the geographic area can be a city, state, or country and the overlapping geometries can be subareas of the geographic area which can themselves include or overlap any number of other geometries. For example, a state can include many geometries for different cities and counties within the state.

In one or more embodiments of the invention, the geocode analysis module (145) includes functionality to create a set of variably sized tiles representing each of the overlapping geometries. Each of the tiles is defined by a geohash value and the size of each tile is dependent on a granularity of the geohash value. For example, FIGS. 2, 3, and 4 depict various examples of tiles and their corresponding geohash values.

A geohash value, in one embodiment is based on location coordinates of a particular geographic location. The location coordinates, in one embodiment are longitude and latitude values representing a particular geographic location and may be obtained in variety of ways including GPS receiver (e.g., GPS receiver 106 shown in FIG. 1). A geohash value is generated by interleaving bits of latitude and longitude and then converting the bit representation to a base32 representation. For example, location coordinates are first converted to their binary representation. The binary representations of the location coordinates are then interleaved starting, in one embodiment, with the most significant bits. The resulting interleaved binary string is then converted, in one embodiment, to a base32 representation referred to as a geohash. In one embodiment, each character of the geohash represents five bits of interleaved binary representations of the longitude and latitude of a particular location based on the particular location's coordinates.

Figure 2:
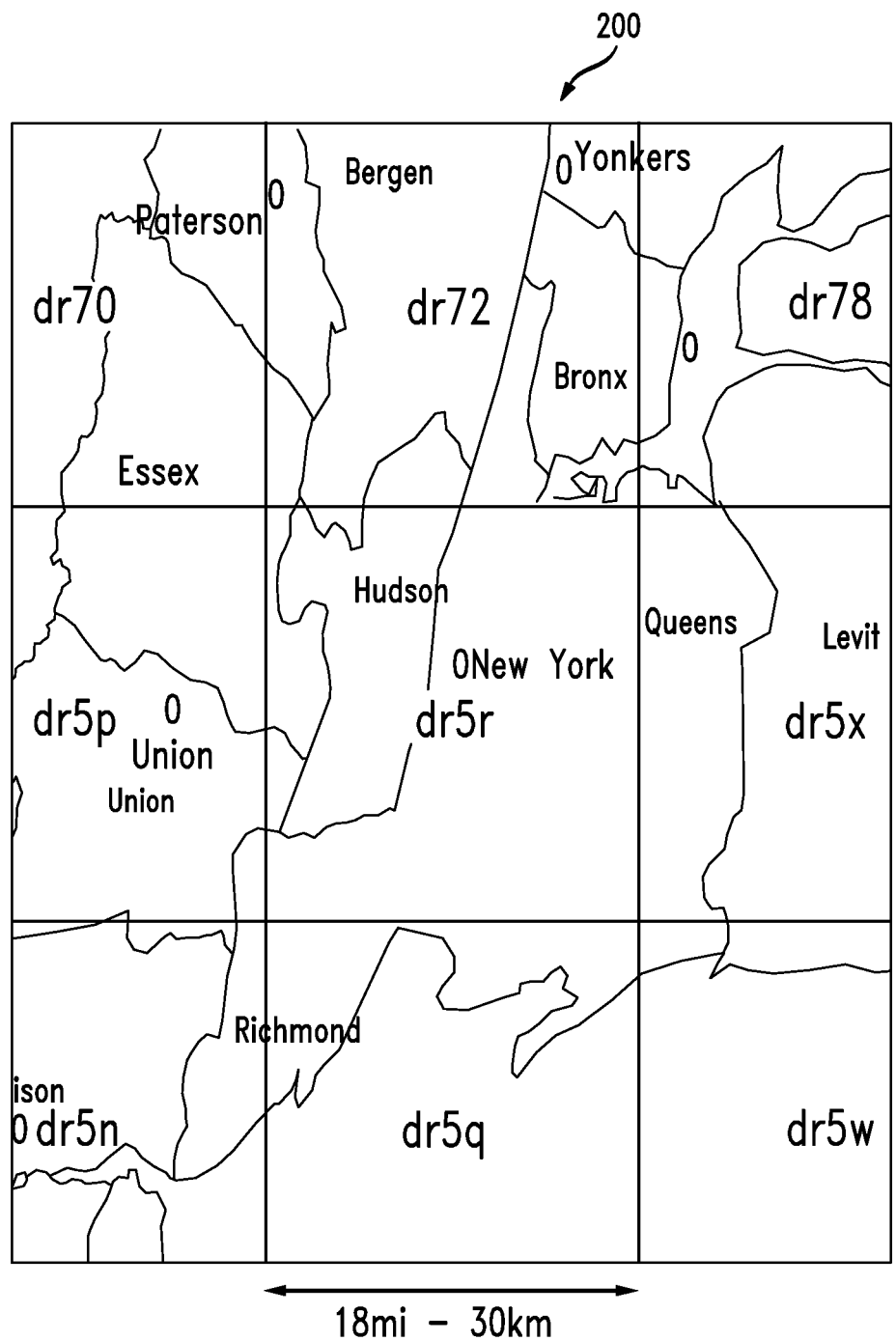
FIG. 2 depicts a geographic area divided into a plurality of 4-character geohash tiles.

FIG. 2 depicts a 4-character geohash projection 200 in which a portion of a geographic area of the North Eastern United States is shown divided into a plurality of tiles. FIG. 2 depicts the geographic area divided into nine tiles, designated in geohash values from top left to bottom right as dr70, dr72, dr78, dr5p, dr5r, dr5x, dr5n, dr5q, and dr5w. Each geohash value is generated based on location coordinates as described above using a substantial center of a tile as location coordinates for each particular tile. The length of a geohash, in one embodiment, is related to a size of an associated tile. As shown in FIG. 2, a 4-character geohash, in one embodiment, is used to represent a tile having a width representing approximately 18 miles (30 kilometers).

Figure 3:
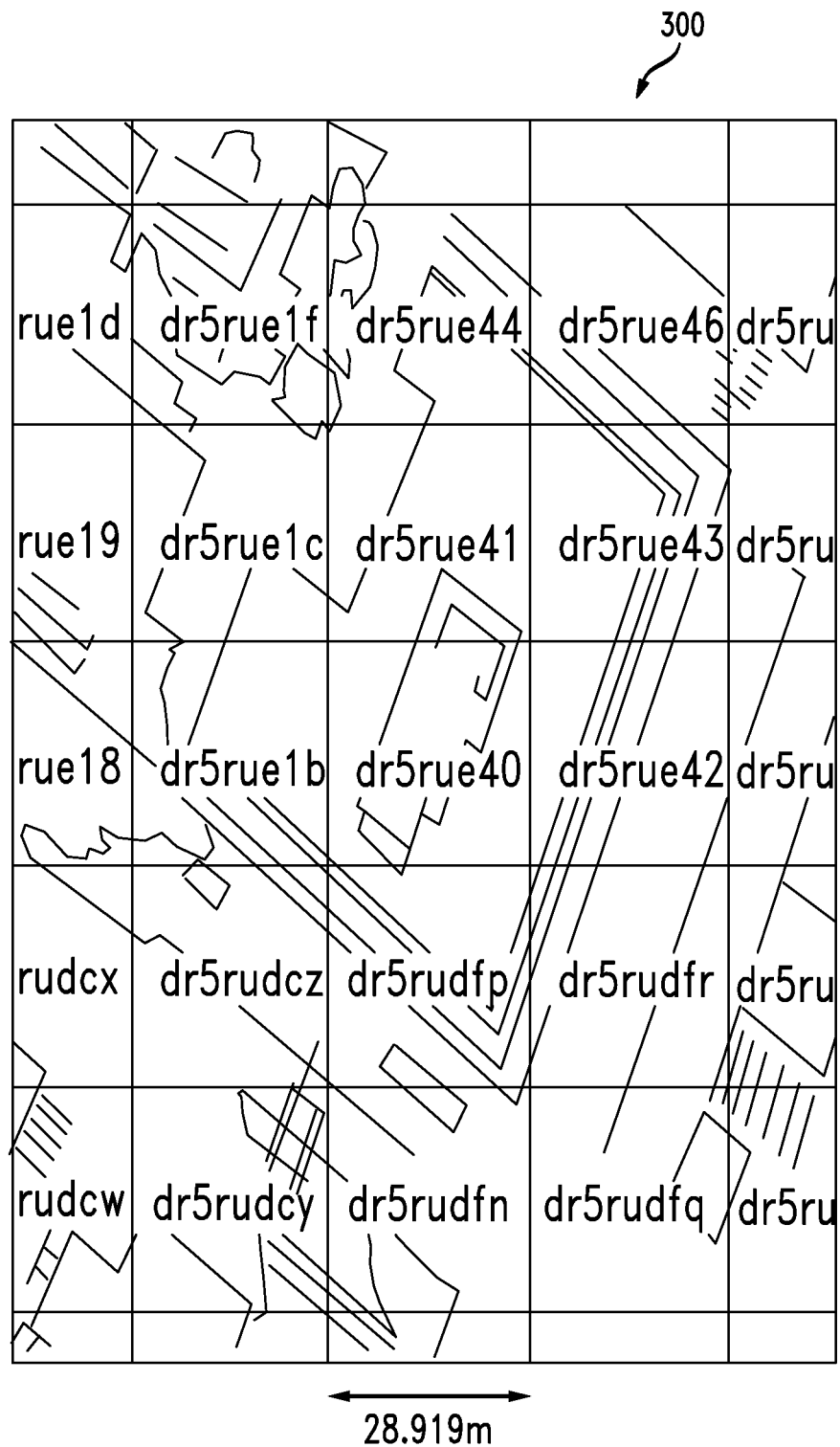
FIG. 3 depicts a geographic area divided into a plurality of 8-character geohash tiles.
Figure 4:
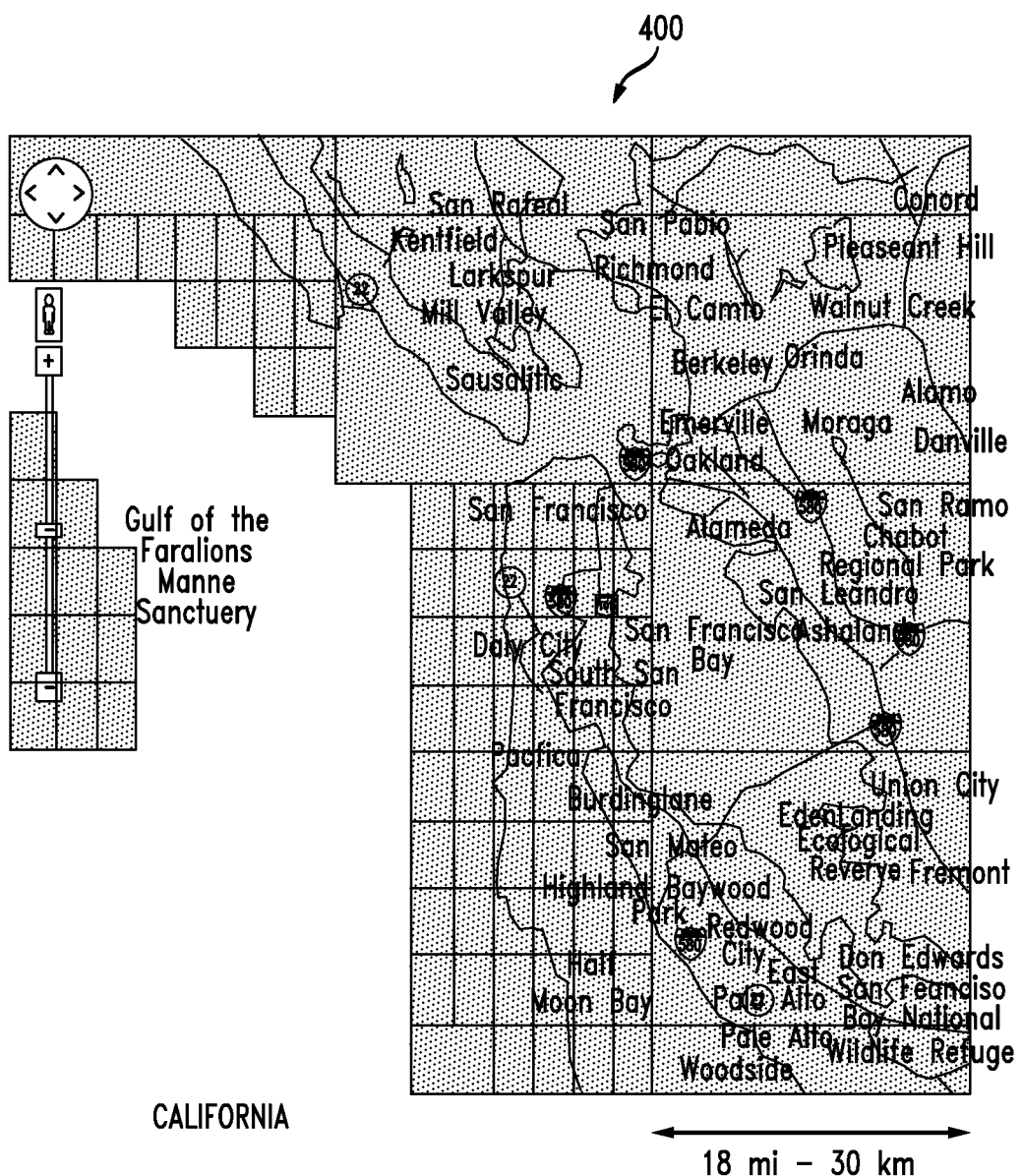
FIG. 4 depicts a geographic area divided into a plurality of 4-character and 5-character geohash tiles.

FIG. 3 depicts an 8-character geohash projection 300 in which a portion of a geographic area is shown divided into a plurality of tiles. As shown in FIG. 3, the center tile of the geographic area is designated geohash value dr5ue40. In one embodiment, the length of a geohash value is inversely related to a size of an associated tile bounding a geographic area. Accordingly, the 8-character geohash values shown in FIG. 3 each identify a smaller geographic area than the 4-character geohash values shown in FIG. 2. In one embodiment, the length of a geohash value is related to the precision of the location coordinates used to generate the geohash. For example, 4-character geohash values represent 20 bits of combined longitude and latitude values. 8-character geohash values represent 40 bits of combined longitude and latitude values. In one embodiment, a geohash value can be generated based on location coordinates wherein the associated longitude and latitude values can be shortened via techniques, such as truncation or rounding, to produce a geohash having a desired number of characters.

An entire geographic area can be divided into a plurality of tiles based on a desired accuracy for location determination. For example, the entire United States could be divided into a plurality of tiles where each tile represents one square meter. However, it may not be efficient to divide an entire geographic area into a plurality of tiles with this level of accuracy since not all areas may require the same level of location determination accuracy. Accordingly, different geographic areas may be divided into a plurality of tiles based on a desired level of accuracy. For example, a sparsely populated large area may only require a plurality of tiles where each tile is approximately twenty five square kilometers. Densely populated areas may require a plurality of tiles where each tile is approximately one square meter.

FIG. 4 depicts a geographic area 400 representing a portion of the state of California divided into a plurality of tiles wherein certain areas are covered by more tiles than others. As shown in the right side of FIG. 4, several tiles are associated with 4-character geohashes. The center and lower center of FIG. 4 depict tiles represented by 5-character geohashes. As depicted in FIG. 4, 4-character geohash tiles are larger than 5-character geohash tiles. As such, 5-character geohash tiles represent smaller areas and provide more accuracy in determining a particular location. As shown in FIG. 4, different size tiles can be used in different geographic areas depending on a desired accuracy of location determination.

Figure 5:
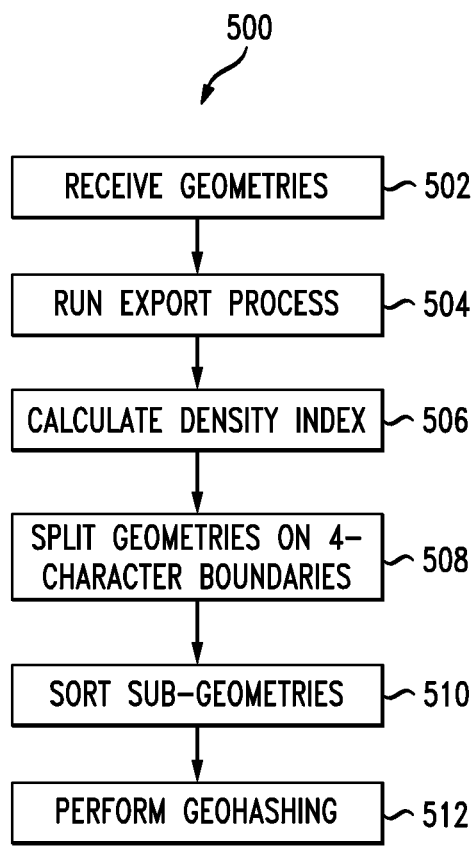
FIG. 5 depicts a flow chart of a method for generating a plurality of Tab-separated-value files pertaining to geohashes for a geographic area according to one embodiment.

FIG. 5 depicts a flowchart of a method 500 for generating a plurality of tab-separated-values ("TSV") files pertaining to geohashes for a geographic area according to one embodiment. At step 502, geometries (e.g., tiled geographic areas) are received from one or more third party providers (e.g., TomTom, Pitney-Bowes, NAVTEQ, Bing Maps, and OpenStreetMap). In one embodiment, geometries are associated with an 8-byte identifier referred to as a "PlaceID" and stored in a place database associated with further metadata about the place (e.g., localized names, business-specific information, 2-letter country code, etc.). In one embodiment, this database is geocode repository 115 (shown in FIG. 1).

At step 504, an export process is run in which the place database is queried for PlaceID, PlaceType, Geometry, and other metadata about one or more places. PlaceType, in one embodiment, is an enum (e.g., an enumerated type which is a data type consisting of a set of named values called elements, members, or enumerators of the type) of the general categories of places (e.g., city, state, country, etc.) These tuples are serialized, in one embodiment, in TSV format using an unsigned-64 bit hex representation of the PlaceID, an integer for the PlaceType, and the base64 gzipped well-known binary representation of the geometry. Base64, in one embodiment, refers to an encoding format used to embed binary data in ASCII string format. Gzipped, in one embodiment, refers to applying an LZ77 data compression algorithm to a sequence of bytes. Serialized TSV files are then uploaded to a hadoop distributed file system ("HDFS").

At step 506, a density index is calculated. Different geographic areas may require more tiles than others in order to provide more accurate location information. The number of tiles required for a particular geographic area may be based on one or more factors. For example, the density index may be based on a number of businesses and/or residences in a particular area, a number of requests from different users in a particular area, or other factors which provide an indication that there is a need for a specific level of accuracy with respect to location determination. The density index may also be based on a type of analysis to be conducted that is related to a geographic area in some manner. For example, the density index may be based on a level of accuracy required for a geographic analysis related to migration patterns, pollution samples, disease outbreaks, species distributions, etc. The density index, in one embodiment, is based on a frequency of occurrence of an event in a related geographic area. The density index, in one embodiment is specified by a user for a particular geographic area. For example, a user may specify that a particular geographic area requires a specific level of accuracy by adjusting the density index associated with the particular geographic area. The density index, in one embodiment, may be based on factors identified by other systems. For example, a messaging system (e.g., Twitter,) or a social network (e.g., Facebook) may identify a desired density index based on user activity such as a number of message posts or status updates occurring in a particular area.

In one embodiment, the density index is calculated based on population density. For example, a city is typically more densely populated than a suburb while a suburb may be more densely populated than a desert or wilderness. In one embodiment, a number of tiles associated with a particular geographic area is based on a density index of the particular geographic area. A density index for a particular area is calculated based on request frequency from users in a particular N-character geohash area who have GPS enabled devices. For example, a density index could be calculated for a 4-character geohash area. In one embodiment, the density index allows an area (e.g. bounded by a 4-character geohash tile) to be classified as one of a high, medium, or low usage area. In one embodiment, usage areas are defined as follows. A high usage area is an area in which the frequency of user requests is greater than two times the standard deviation from a mean frequency of requests for a plurality of areas. A medium usage area is an area in which the frequency of requests are less than two times the standard deviation and greater than the mean frequency of requests for a plurality of areas. A low usage area is an area in which the frequency of requests are less than or equal to the mean frequency of requests for a plurality of areas.

In one embodiment, a density index pertaining to user activity is referred to as a user density index. In one embodiment, a set of variably sized tiles is created by identifying a set of user density indices each representing a frequency of requests from user devices in at least a portion of a geographic area and using the user density indices to determine the set of variably sized tiles, wherein the size of each of the set of variably sized tiles is positively correlated with a user density index corresponding to that tile.

At step 508, geometries are split on 4-character geohash boundaries to create sub-geometries which allows for easier distributed processing. The sub-geometries are randomly sorted and then serialized using thrift, and stored as PlaceID, PlaceType, and geometry values. The random sort, in one embodiment, is used to distribute complicated sub-geometries evenly across a cluster. Thrift, in one embodiment, refers to Apache Thrift serialization framework which allows a user to define data structures using an interface description language (IDL). Thrift then generates code for use in many different languages which takes native data structures and serializes them into byte arrays which can be written to disk.

It should be noted that tiles can overlap. For example, a 4-character geohash tile may contain a plurality of 5-character geohash tiles. The 5-character geohash tiles within the 4-character geohash tile are referred to as sub geometries. In one embodiment, sub geometries are analyzed to determine a 4-character geohash tile in which the 5-character geohash tile is located. A user density for the 4-character geohash tile in which the 5-character geohash tile is located is identified by a density index value. Based on the density index, the appropriate geohashing heuristics are used for an area of that density. Heuristic parameters, in one embodiment, include a maximum number of geohashes to be used to represent a geometry (e.g., a geographic area), level of detail (i.e., how small a geohash tile should be used in creating a representation of the geometry).

In one embodiment, Apache hadoop jobs run algorithms for calculating user density (step 506), sort and serialize sub-geometries (step 510) and perform geohashing of tiles (step 512) that make up a geometry as described above. In one embodiment, the algorithms the hadoop jobs run are written in Scalding which is a scala framework for writing hadoop jobs and provides high-level functional-programming primitives for dealing with large data. In another embodiment, the algorithms are written using Java using raw hadoop map and reduce calls. The algorithms generate one or more TSV files which, in one embodiment, are output in HDFS format files.

The output of the hadoop jobs, namely the TSV files, is then used by another hadoop job, in one embodiment, to create a tightly-packed-trie data file ("TPTrie data file"). The hadoop job to create a TPTrie data file first copies a TSV file from HDFS to a local file. Each PlaceID and List [Geohash] value pair are read and transformed into a List[(Geohash, PlaceID)]. Each geohash is then inserted into an in-memory trie. It should be noted that values are kept in a separate data structure that removes duplicates and returns a 4-byte integer identifier. The 4-byte identifier, in one embodiment, is an offset into a byte array that stores serialized PlaceID values. A post-order traversal of the in-memory trie is performed to serialize each node using the TPTrie formal. A data segment of the TPTrie (e.g., the byte-array of PlaceIDs) is then written to a data file and the data file is uploaded to HDFS for distribution to a cluster.

Figure 6:
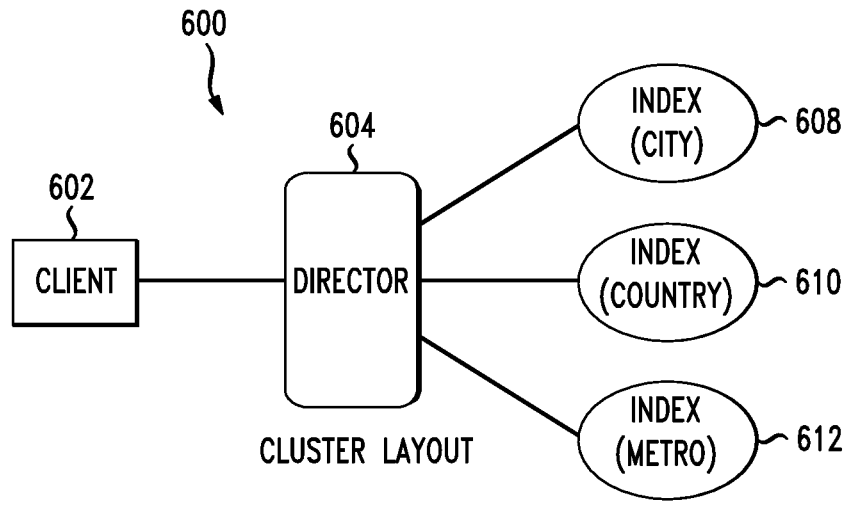
FIG. 6 depicts a cluster layout comprising a group of processes according to one embodiment.

FIG. 6 depicts cluster 600 comprising a group of processes (e.g. Java virtual machine processes) according to one embodiment. Cluster 600 is used to determine a location based on a geohash. Client 602 makes a request which is transmitted to director 604. Director 604 parses the client request and determines which index nodes to route the request to. Based on the determination, director 604 routes the request to one or more of index (city) node 608, index (country) 610, or index (metro) 612. Each of nodes 608, 610, and 612 can be queried by director 604. In one embodiment, director 604 performs a scatter-gather operation in which a plurality of nodes are queried for portions of data required by director 604 and director 604 assembles the responses to the partial queries to form a full response to the client's query. For example, in one embodiment, certain nodes contain City data and other nodes contain State data. To put together "Columbus, Ohio" query machines are needed in both the city data group and the state data group. The city group would return "Columbus" and the state group would return "Ohio". The "Columbus" and the "Ohio" are then combined to produce the full result of "Columbus, Ohio" in response to a request from a client.

It should be noted that the information in nodes 608, 610, and 612 can be alternatively located in director 604. The information stored in director 604 is stored on one or more nodes (e.g., index (city) node 608, index (country) node 612, etc.) when the total data size of the information becomes too large. For example, information stored in director 604 can be moved to one or more nodes when the total data size of the information is larger than processing memory space of director 604. When the information is located in director 604, then a response to a client query is determined by director 604 without requesting information from other nodes.

Figure 7:
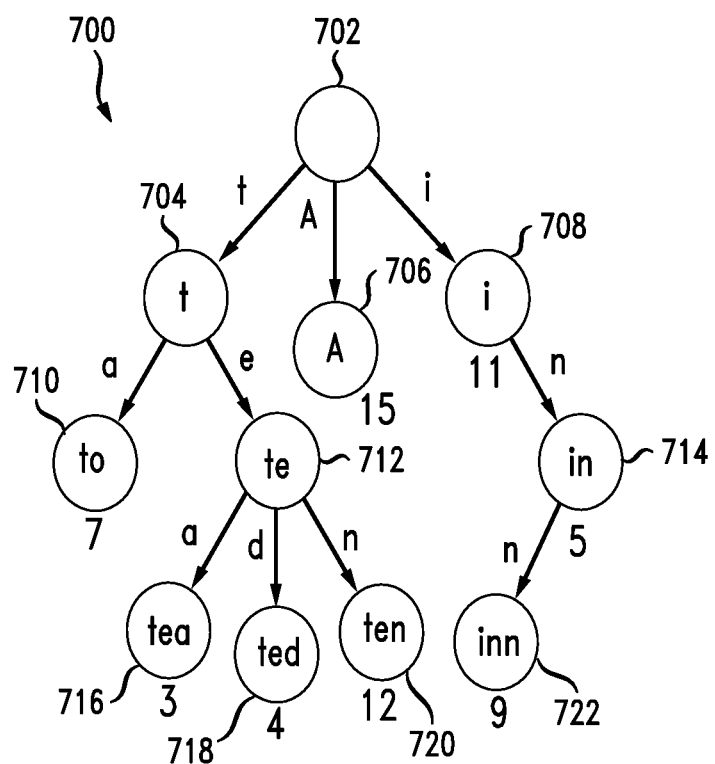
FIG. 7 depicts a trie data structure according to one embodiment.

FIG. 7 depicts trie data structure 700 optimized for fast common-prefix lookups according to one embodiment. Trie 700 is an ordered trie data structure for storing information. No node of trie 700 stores the key associated with that node. Instead, the nodes position in the trie defines the key with which it is associated. All descendents of a node have a common prefix of a string associated with that node and root node 702 is associated with an empty string. Values are not normally associated with every node but instead with leaves or inner nodes that correspond to keys of interest. In one embodiment, the trie is a deterministic finite automaton, although the symbol on each edge is often implicit in the order of the branches. At node 702, it is determined which transition (i.e., t, A, or i) matches a string which is being compared to trie 700. For example, if the string "ten" is being compared to trie 700, transition t is selected and another comparison is performed at node 704. Since the next character in the string "ten" is an "e", the e transition is selected and another comparison is performed at node 712. Since the next character in the string "ten" is "n", the n transition is selected and the comparison ends at node 720. Similarly, trie 700 may be traversed to arrive at node 710 for the string "to", node 716 for the string "tea", etc. Similarly, geocode tries can be traversed by comparing geohash values.

Figure 8:
FIG. 8 depicts a geographic representation of an area according to one embodiment.

Geohashes facilitate conversion of location coordinates into text descriptive of the location identified by the location coordinate. FIG. 8 depicts a geographic representation of an area 800 known as the "Tenderloin" area of San Francisco, Calif. As shown in FIG. 8, a location 802 is identified in area 800. In one embodiment, this location is provided by a user via a handheld user device having a GPS receiver. The GPS receiver generates location coordinates for location 802 shown in FIG. 8. However, location coordinates are two strings of numbers which, although accurate, do not provide most users with useful information. As previously described, a geohash value is generated based on the location coordinates. The geohash is then applied to a trie to determine a text location description.

Figure 9A:
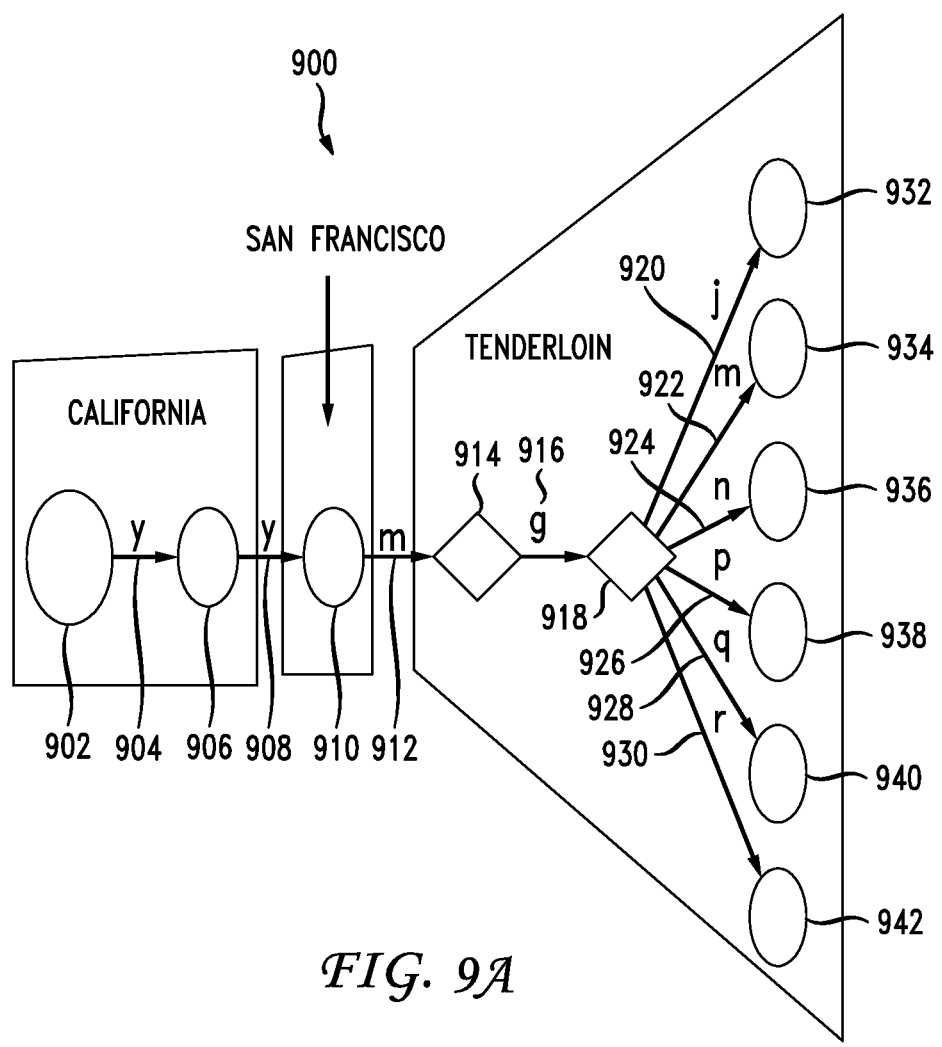
FIG. 9A depicts an example of a search in which a geohash is applied to a trie.

FIG. 9A depicts an example of a search in which a geohash is applied to a trie 900. Circles depicted in FIG. 9A are nodes having a value while diamonds represent transitive nodes and arrows represent an edge or transition to another node. As such, nodes are depicted either as circles or diamonds. Node 902 is a circle associated with a geohash prefix 9q8. The geohash prefix 9q8 is associated with text identifying tiles having the 9q8 prefix as locations in California. Next, as shown by arrow 904, a matching transition having a value of "y" is determined and a location within California identified by the geohash value 9q8y is determined to be associated with node 906. As shown by arrow 908, a matching transition having a value of "y" is determined and the location "San Francisco" identified by the geohash value 9q8yy is determined to be associated with node 910. As shown by arrow 912, a matching transition having a value of "m" is determined and node 914 is associated with the geohash value 9q8yym. Although node 914 is associated with a geohash known to be in the Tenderloin area of San Francisco, the node is not associated with a more specific text location identifier and is a transitive node.

In one embodiment, transitive nodes are used to connect nodes of a trie together. Not every node has data, but those nodes are necessary to hold locations of further nodes in the trie, or, if they have zero further nodes, the last node is terminal since it ends the search. In other words, in one embodiment, transitive nodes hold no data, but act as placeholders so that a trie can be traversed to nodes further down the trie which may be associated with data a client is interested in.

Returning to FIG. 9A, as shown by arrow 916, a matching transition having a value of "g" is determined and node 918 is associated with geohash value 9q8yym. Similar to node 914, node 918 is not associated with a more specific text location identifier and is also a transitive node. Arrows 920, 922, 924, 926, 928, and 930 identify transitions j, m, n, p, q, and r, respectively. As such, depending on a specific geohash value with the prefix 9q8yymg, one of nodes 932, 934, 936, 938, 940, and 942 would be used based on a specific transition. For example, the geohash 9q8yymgj would use matching transition value "j" to determine that node 932 is associated with geohash value 9q8yymgj.

Figure 9B:
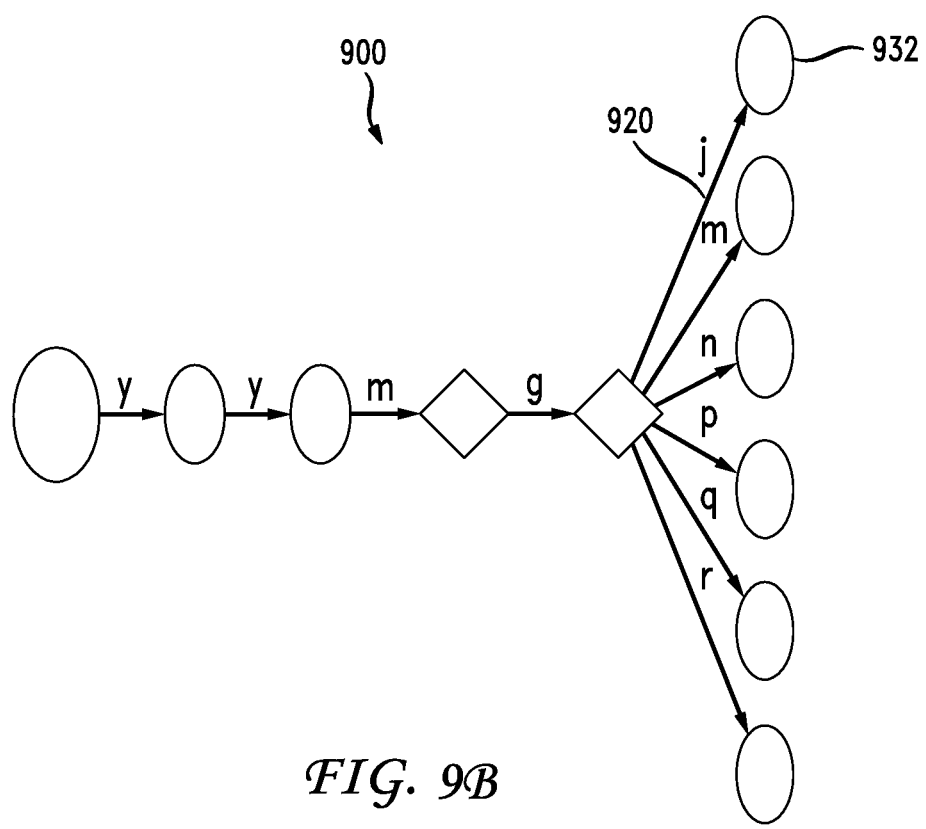
FIG. 9B depicts an example of a search in which a geohash is applied to a trie.

FIG. 9B depicts an example in which transition 920 having a value of j is determined to match geohash value 9q8yymgj associated with node 932. In response to determining that node 932 is associated with geohash value 9q8yymgj, location information associated with node 932 may be provided to a user. In this example, the user may be provided with location information comprising the text "Tenderloin area, San Francisco, Calif."

As described in conjunction with FIGS. 9A and 9B, location coordinates latitude: 37.781910 and longitude: −122.416507 are converted to a geohash value which is then applied to a geocode trie in order to provide a user with a text description of the location coordinates, in the example of FIGS. 9A and 9B, the Tenderloin area, San Francisco, Calif. It should be noted that, in one embodiment, a geohash value may contain a placeholder value that is not used. As shown in FIG. 9B, the geohash valued 9q8yymgj0s contains the placeholder "0s" which is not used in applying the geohash value to the geocode trie. In one embodiment, the "0s" indicates an end of the geohash. As such, if a trie is traversed using all values in a particular geohash value and the "0s" placeholder is reached, the "0s" indicates that the geohash contains no additional values. As such, if the "0s" in a geohash value is reached while traversing a trie, the last node associated with data will be considered a terminal node and information obtained up to that node will be used to provide location information. For example, if a search term "firetruck" were used to traverse a trie which includes a "fire[DATA]" node (where DATA represents a terminal node) the "truck" portion of the search term would be discarded and the [DATA] would be returned in response to a search request for "firetruck".

Figure 10:
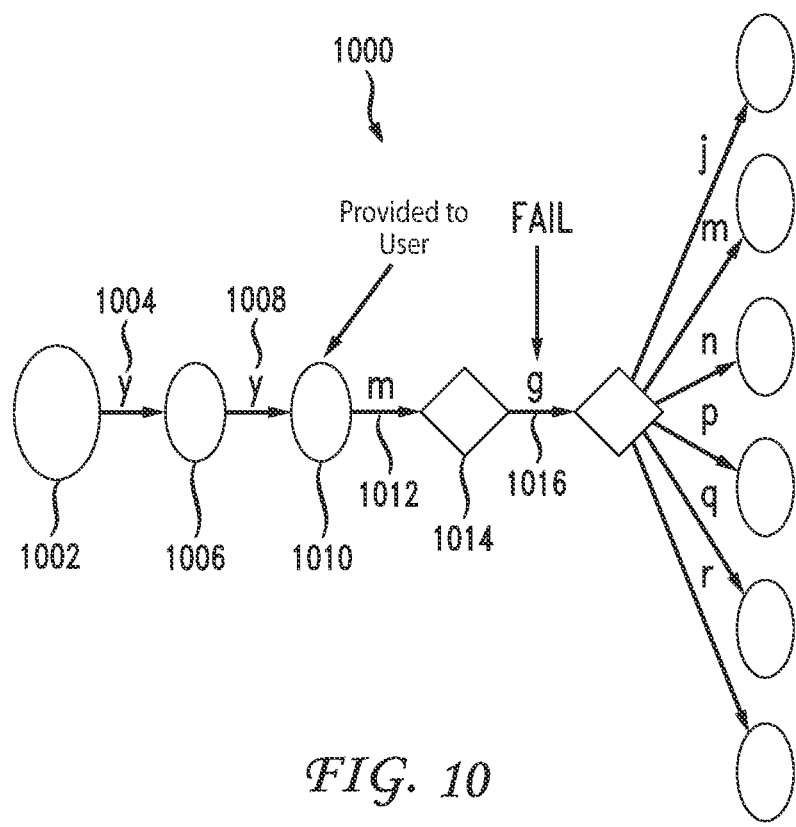
FIG. 10 depicts an example of a search in which a geohash is applied to a trie.

Since not all geographic areas may be associated with geohashes longer than 4-characters, a user may be provided with a more general text decryption of a location based on location coordinates. FIG. 10 depicts the application of geohash 9q8yymqcg7 to a geocode trie 1000 which does not have a node associated with the entire geohash value. As shown in FIG. 10, node 1002 is associated with geohash prefix 9q8 which matches the beginning portion of geohash 9q8yymqcg7. In addition, transition 1004 associated with the value "y" is used to determine that node 1006 is associated with geohash prefix 9q8y. Also, transition 1008 with the value "y" is used to determine that node 1010 is associated with geohash prefix 9q8yy. Transition 1012 with the value "m" is used to determine that transition node 1014 is associated with geohash prefix 9q8yym. However, transition 1016 with the value "g" does not match geohash 9q8yymqcg7. As such, node 1010 is determined to be the closest match available for the geohash 9q8yymqcg7 and location information associated with node 1010 is provided to a user. Node 1014 is a transition node which does not have location information associated with it. As such, node 1010 is the best matching node having location information associated with it and the location information associated with node 1010 is used.

Figure 11:
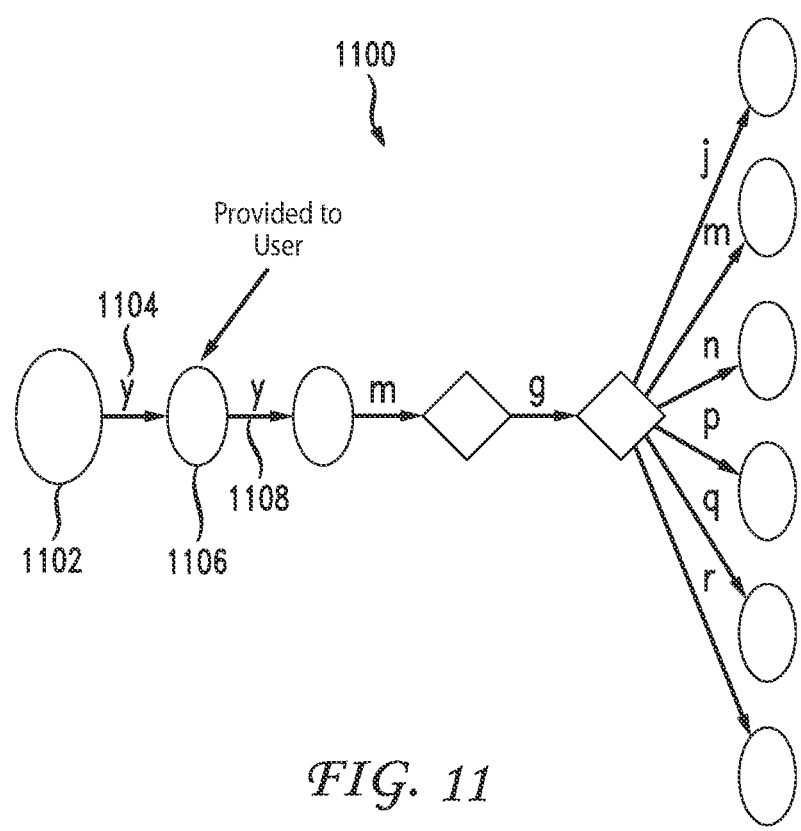
FIG. 11 depicts an example of a search in which a geohash is applied to a trie.

The length of a geohash is based on the coordinates used to generate the geohash. As such, location coordinates with varying degrees of accuracy will produce similar geohashes with varying degrees of accuracy. For example, location coordinates latitude 37.78, longitude −122.41 can be used to generate the 4-character geohash 9q8y. A 4-character geohash can be used to determine location information having a comparable accuracy to the 4-character geohash value. FIG. 11 depicts geohash 9q8y as applied to geocode trie 1100. Node 1102 is associated with geohash prefix 9q8. Matching transition 1104 has a value of "y" and is used to determine that node 1106 is associated with geohash 9q8y. Since there are no more characters in the geohash provided, the location information associated with node 1106 may be provided to a user. It should be noted that the location information provided by geohash 9q8y will only be as accurate as the geohash allows. In this example, referring to FIG. 9A, applying geohash value 9q8y to geocode trie 900 would produce location information identifying the 4-character geohash as being in California. As such, the 4-character geohash 9q8y results in location information identifying the geohash as being located in California.

In one or more embodiments of the invention, the geocode analysis module (145) includes functionality to construct a geocode trie structure representing the variably sized tiles. In one or more embodiments, one or more nodes in the trie can each represent a set of tiles, such that transitions between the nodes correspond to characters of the geohash values associated with the tiles.

Figure 12:
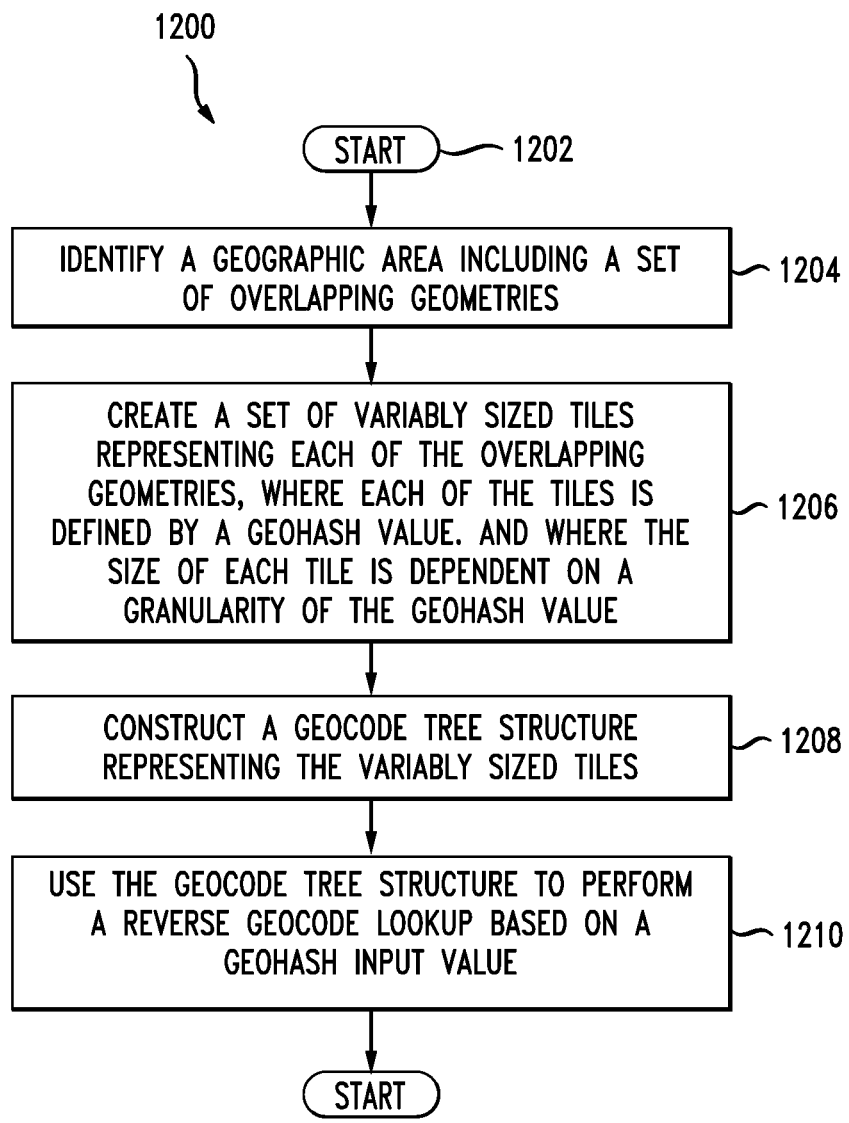
FIG. 12 depicts a flow chart of a method for generating a geocode trie and performing a reverse geocode look up according to one embodiment.

In one or more embodiments of the invention, the geocode analysis module (145) includes functionality to use the geocode trie structure to perform reverse geocode lookups based on a geohash input value. Flowchart 1200 of FIG. 12 shows a method of generating a geocode trie and performing a reverse geocode lookup, in accordance with various embodiments of the invention. Method 1200 starts at step 1202. At step 1204 a geographic area including a set of overlapping geometries is identified. At step 1206 a set of variably sized tiles representing each of the overlapping geometries is created where each of the tiles is defined by a geohash value and where the size of each tile is dependent on a granularity of the geohash value. At step 1208, a geocode trie structure representing the variably sized tiles is constructed. At step 1210, the geocode trie structure is used to perform a reverse geocode lookup based on a geohash input value. After step 1210, the process may repeat for another geographic area.

In one or more embodiments of the invention, the geocode lookup engine (145 of FIG. 1) includes functionality to receive a reverse geocode request identifying one or more location coordinates. For example, the reverse geocode request can include GPS coordinates originating from the GPS receiver (106 of FIG. 1) of the client (105 of FIG. 1).

In one or more embodiments of the invention, the geocode lookup engine (145 of FIG. 1) includes functionality to generate a geohash value using the location coordinates. The geohash value can be generated, for example, by taking the bits of a latitude and longitude, interleaving them, then encoding the result in base32 to create a convenient string representation (i.e., the geohash value).

In one or more embodiments of the invention, the geocode lookup engine (145 of FIG. 1) includes functionality to traverse a geocode trie structure based on the geohash value. The following is an exemplary method of traversing the geocode trie structure:

For each character c of the geohash:
  If the current node has a valid transition c:
    follow the transition, and set "current" node to the node the transition leads to.
    repeat for the next character.
  If there are no more transitions:
    you have reached a leaf node, return the longest matching prefix
  If c is not a valid transition from the current node onward or you are out of characters:
    back down the trie and find the last node that contains a value (a place we know about).

Figure 13:
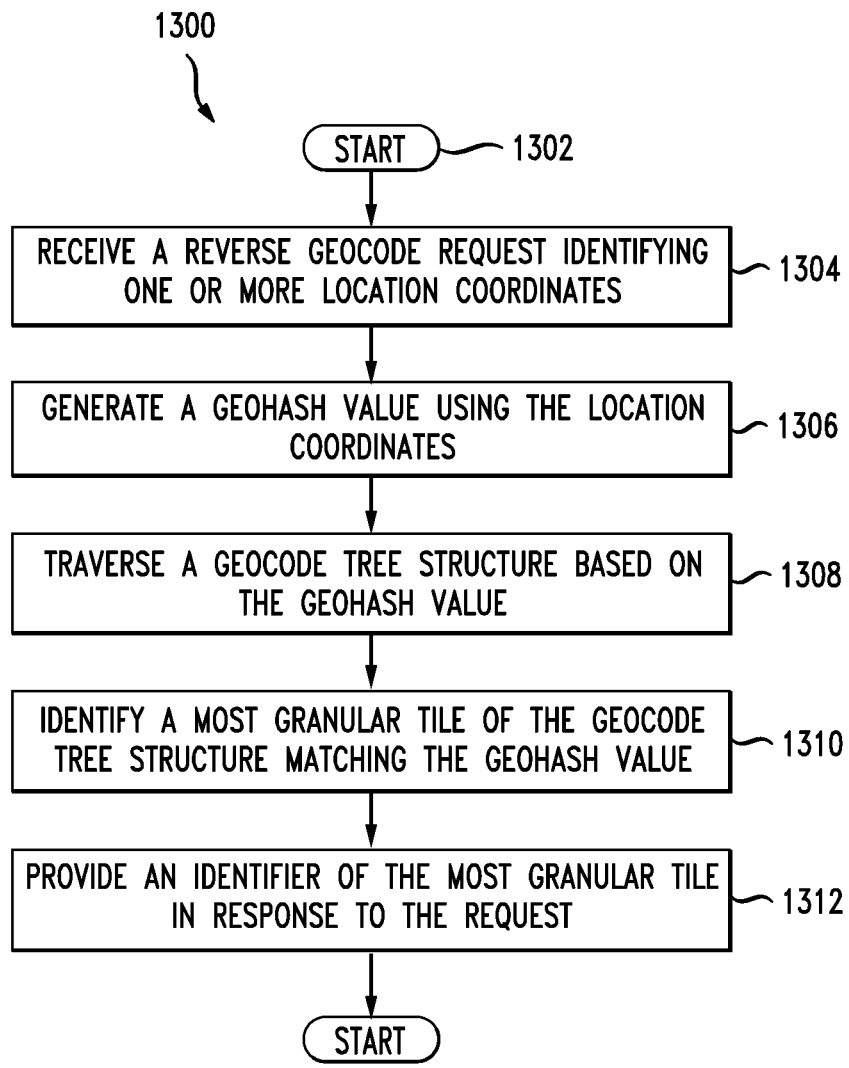
FIG. 13 depicts a flowchart of a method for performing a reverse geocode look up according to one embodiment.

FIG. 13 depicts a flowchart of a method 1300 for performing a reverse geocode lookup. Method 1300 begins at step 1302 and proceeds to step 1304 in which a reverse geocode request identifying one or more location coordinates is received. At step 1306 a geohash value is generated using the location coordinates. At step 1308 a geocode trie structure is traversed based on the geohash value. At step 1310 a most granular tile of the geocode trie structure matching the geohash value is identified. At step 1312, an identifier of the most granular tile is provided in response to the request. After step 1312, the method 1300 may be repeated for additional reverse geocode requests that are received.

In one or more embodiments of the invention, the geocode lookup engine (145 of FIG. 1) includes functionality to identify a most granular tile of the geocode structure matching the geohash value. A geohash value of this matching tile is then used as input to a hash table in order to identify a location. Identifying the most granular tile can involve an approximate match (e.g., matching a first N characters of the geohash value with the geohash value of the tile, for N>0) or an exact match (i.e., all characters of the geohash value match the geohash value of the tile). The geocode lookup engine (145 of FIG. 1) can be configured to return an identifier of the location and/or additional information associated with the location (e.g., a name, location coordinates, etc.) to the client (105 of FIG. 1) in response to the request.

In one or more embodiments of invention, the client (105 of FIG. 1) can be any device including capability to identify one or more location coordinates (e.g., using the GPS receiver (106 of FIG. 1)). For example, the client can be a smartphone, tablet computer, laptop computer, a vehicle entertainment system, and/or any other device capable of communicating one or more location coordinates to the geocode system (100). In one or more embodiments of the invention, the client (105 of FIG. 1) is a server application configured to receive the location coordinates from one or more other clients, provide the coordinates to the geocode system (100 of FIG. 1), and/or to relay a response from the geocode system (100 of FIG. 1) to the appropriate clients.

In one or more embodiments of the invention, the geocode analysis module (145 of FIG. 1) is a software application or a set of related software applications configured to execute on one or more hardware processors. The geocode analysis module (145) can include one or more threads configured to construct a geocode trie structure. The geocode analysis module (145 of FIG. 1) can be a component of a service-oriented architecture (SOA) or any other software platform, either inside or outside of the geocode system (100 of FIG. 1), in accordance with various embodiments. In one or more embodiments of the invention, one or more components of the geocode analysis module (145 of FIG. 1) reside in a cloud computing application in a network distributed system. In one or more embodiments of the invention, geocode analysis module (145 of FIG. 1) is integrated within or operatively connected to one or more other components of the geocode system (100 of FIG. 1).

In one or more embodiments of the invention, the geocode lookup engine (150 of FIG. 1) is a software application or a set of related software applications configured to execute on one or more hardware processors. The geocode lookup engine (150 of FIG. 1) can include one or more reader threads configured to perform multiple concurrent reverse geocode lookups using data (e.g., a geocode trie structure) in the geocode repository (115 of FIG. 1). The geocode lookup engine (150 of FIG. 1) can be a component of a service-oriented architecture (SOA) or any other software platform, either inside or outside of the geocode system (100), in accordance with various embodiments. In one or more embodiments of the invention, one or more components of the geocode lookup engine (150 of FIG. 1) reside in a cloud computing application in a network distributed system. In one or more embodiments of the invention, geocode lookup engine (150 of FIG. 1) is integrated within or operatively connected to one or more other components of the geocode system (100 of FIG. 1).

In one or more embodiments of the invention, the frontend module (110 of FIG. 1) is a software application or a set of related software applications configured to communicate with external entities (e.g., client (105 of FIG. 1)). The frontend module (110 of FIG. 1) can include the application programming interface (API) and/or any number of other components used for communicating with entities outside of the geocode system (100 of FIG. 1). The API can include any number of specifications for making requests from and/or providing data to the geocode system (100 of FIG. 1). For example, a function provided by the API can provide reverse geocode lookups to a requesting client (105 of FIG. 1).

In one or more embodiments of the invention, the geocode repository (115 of FIG. 1) is configured to store one or more geocode trie structures, geographic location data, map data, geohash values, and/or any other data relevant to performing geocode-related functionality (e.g., reverse geocode lookups).

In one or more embodiments of the invention, the geocode repository (115 of FIG. 1) is a database and/or storage service residing on one or more servers. For example, the geocode repository (115 of FIG. 1) may be implemented as a storage service using service-oriented architecture (SOA) and configured to receive requests for data and to provide requested data to other components of the geocode system (100 of FIG. 1). In another example, the geocode repository (115 of FIG. 1) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, the geocode repository (115 of FIG. 1) is a separate application or set of applications residing on one or more servers external (and communicatively coupled) to the geocode system (100 of FIG. 1). Alternatively, in one or more embodiments of the invention, one or more of the data repositories can be an integrated component of the geocode system (100 of FIG. 1) and/or can reside, either partially or entirely, on one or more common hardware devices (e.g., a server).

FIGS. 12 and 13 show flowcharts of methods, in accordance with various embodiments of the invention. While the various steps in these flowcharts are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIGS. 12 and 13 should not be construed as limiting the scope of the invention.

The steps of FIG. 12 can be performed to construct a model for performing reverse geocode lookups. The steps of FIG. 12 can be performed, for example, by a geocode analysis module (e.g., geocode analysis module (145) of FIG. 1, discussed above).

The steps of FIG. 13 can be performed to perform reverse geocode lookups using a geocode trie structure. The steps of FIG. 13 can be performed, for example, by a geocode lookup engine (e.g., geocode lookup engine (150) of FIG. 1, discussed above) in communication with a client computing device.

In one or more embodiments of the invention, one or more steps of the flowcharts are repeated concurrently by multiple threads. For example, STEPS 1204-1208 of FIG. 12 can be performed concurrently by multiple threads of a system. Thus, one or more of the steps can be performed serially, in parallel, and/or by a distributed system, in accordance with various embodiments of the invention.

Figure 14:
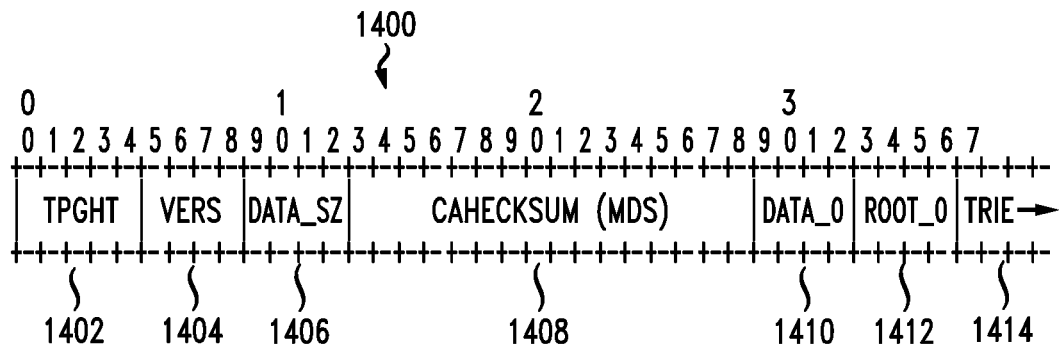
FIG. 14 depicts a file header layout for an implementation of a tightly packed trie according to one embodiment.

FIG. 14 depicts a file header layout 1400 for an implementation of a Tightly Packed Trie according to one embodiment. TPGHT 1402 is an identifier of designating the file as a "Tightly Packed Geohash Trie." In one embodiment, the string used as an identifier is [0x54, 0x50 0x47, 0x48, 0x54]. VERS 1404 identifies a version of the file format as an i32. DATA_SZ 1406 is the size in bytes of the data portion of the related file as an i32. It should be noted that DATA_SZ 1406 can be expanded (e.g., to an i64) if necessary to support sizes greater than two gigabytes. CHECKSUM 1408 is an MD5 sum of the trie and data portion of the file stored as 16 bytes as generated, in one embodiment, by Java's MessageDigest. DATA_0 1410 is an absolute offset into the file to the beginning of the data portion and is stored as an i32. It should be noted that DATA_0 1410 may be expanded to an i64 if necessary. ROOT_0 1401 is the relative offset from the end of the header (in this example, byte 37 is the first byte of the trie) of the root node of the trie. This value is relative because, in one embodiment, the trie is memory-mapped. TRIE 1414 comprises trie nodes and data and extends to the end of the file.

Figure 15:
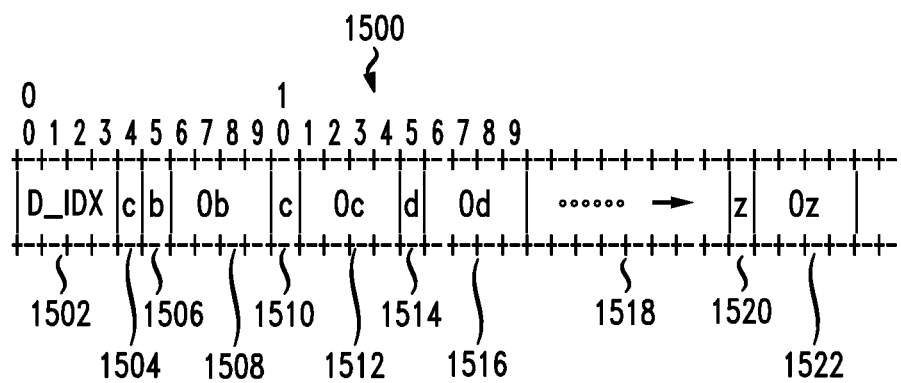
FIG. 15 depicts a data format for a trie node according to one embodiment.

FIG. 15 depicts a data format 1500 for a trie node according to one embodiment. D_IDX 1502 is a positive i32 (i.e., integer 32) value that is used to retrieve the data value for this node from a data section of the file. A negative value is used to indicate that there is no data associated with this node. C 1504 is a count of edges that this node contains and is an i8. For a leaf node, C 1504 will be zero. The maximum value for C 1504 is 32 bytes long based on base32 encoding. The values for b 1506, c 1510, and d 1514 represent edge values as an i8. The values for Ob 1508, Oc 1512, and Od 1516 are the relative offset to the node that edge 'b' transitions to. The "O" in "Ob", "Oc", and "Od" stands for "offset" and each value represents the relative offset from the beginning of the node at 1502 to the next node in the trie. It should be noted that the trie is traversed from left to right in FIGS. 9A, 9B, 10, and 11. The "root" of the trie is located at an end of data format 1500 which is to the right of the diagram shown in FIG. 15. Offsets are interpreted to mean that a jump to an earlier location in a file (toward the left of the diagram) is required. If a node depicted is a root node, and the first character in a related search term is "c", and there is a valid transition through the edge labeled "c" to the next node, the value from 1512 (a 32 bit signed integer) is read and subtracted from the absolute file offset to the node that transition "c" links to.

Figure 16:
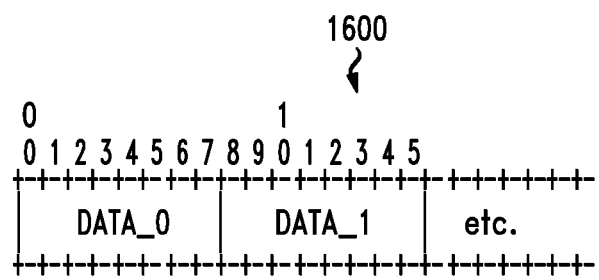
FIG. 16 depicts a data array according to one embodiment.

FIG. 16 depicts a data array 1600 which, in one embodiment, is a simple 1:1 mapping of D_IDK 1502 (shown in FIG. 15) to the Nth long value. The offset is D_IDX*8 and read 8 bytes as i64. [Please provide additional description of FIG. 16 as necessary.]

Figure 17:
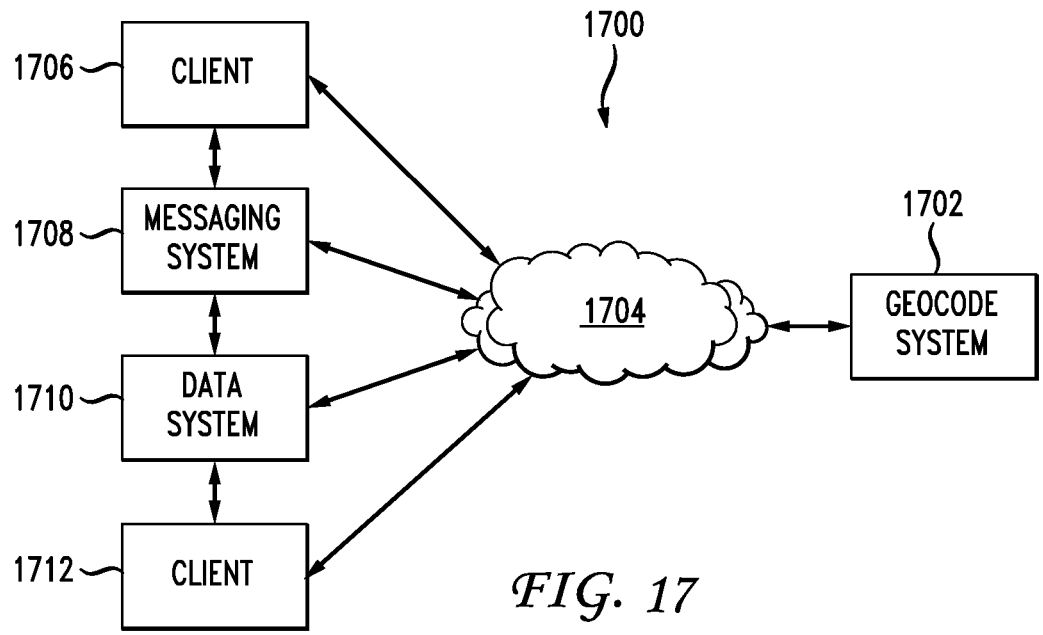
FIG. 17 depicts a system for providing location information according to one embodiment.

FIG. 17 depicts a system 1700 for providing location information according to one embodiment. Geocode system 1702, in one embodiment, is a geocode system for providing location information based on geohash values such as geocode system 100 shown in FIG. 1. Geocode system 1702 is in communication with client 1706 via network 1704. Client 1706 can be any type of electronic device capable of communicating with geocode system 1702 via network 1704. Client 1706 can be a computer, such as a PC, or a mobile device such as a cell phone, smart phone, personal digital assistant, etc. Network 1704 can be any type of wired or wireless network capable of transmitting information to and from various devices connected via the network. In one embodiment, network 1704 is the internet.

Geocode system 1702 is also in communication with messaging system 1708 via network 1704. Messaging system 1704 is also depicted in communication directly with client 1706 and data system 1710 but may also be in communication with those devices via network 1704. Messaging system 1708, in one embodiment, is a short messaging system (e.g., Twitter) but can be other types of messaging systems as well. Data system 1710 is in communication with geocode system 1702 via network 1704 and is also depicted in communication with messaging system 1708 and client 1712. Data system 1710 can also communicate with client 1706, messaging system 1708, and client 1712 via network 1704.

In one embodiment, clients 1706, 1712 communicate with geocode system 1702 directly to retrieve location information. For example, client 1706 can transmit a set of location coordinates to geocode system as part of a request for location information. In response to the request, geocode system 1702 returns location information to client 1706 based on the location coordinates as described above in conjunction with FIGS. 1 and 13.

Messaging system 1708 communicates with geocode system 1702 to retrieve location information. Messaging system 1708, in one embodiment, is a messaging system such as Twitter. In one embodiment, a request from messaging system 1708 for location information is based on one or more factors. For example, a user posting a message via an associated account may trigger a request for location information from messaging system 1708 to provide location information in the user's post. The user's post can include the user's message as well as an indication of when the message was posted and the location of the user when the user created the message. Messaging system 1708 may also transmit a request for location information in response to a user request to view messages from people or entities they are associated with (e.g., messages from users that a particular user has indicated they would like to receive). Messaging system 1708 can transmit a request to determine location information concerning a particular user in order to provide that user with messages posted from locations near the user's location.

In one embodiment, messaging system 1708 can provide messages to a user based on messages or subjects that are determined to have a significant amount of activity associated with them (e.g., trending messages or subjects). Messaging system 1708 can request location information for trending messages or subjects in order to provide users with trending messages or subjects based on the user's location. In addition, location information retrieved from geocode system 1702 can be used to provide users with trending messages or subjects along with information concerning where the trending messages or subjects are occurring in significant numbers.

In one embodiment, messaging system 1708 receives a request from client 1706. The request from client 1706 can pertain to a variety of information such as a request for messages that a user associated with client 1706 is interested in or a request for trending messages or subjects. In one embodiment, the request contains location coordinates of client device 1706. In response to the request, messaging system 1708 transmits the location coordinates to geocode system 1702 via network 1704. In response to the location coordinates, geocode system 1702 transmits location information to messaging system 1708. The location information, in one embodiment, is generated by geocode system 100 of FIG. 1 using the method depicted in FIG. 13. Messaging system 1708 then determines a response to the request based on information in the request as well as the location information provided by geocode system 1702. Messaging system 1708 then transmits a response to client 1706 based on the request from client device 1706 and location information provide by geocode system 1702. For example, a user may request to see messages which were posted near the location at which the client device is currently located. In response, messaging system 1708 determines the current location of the client device based on the location coordinates provided by the device and identifies messages that were posted within a certain radius of the location of the client device.

Data system 1710, in one embodiment, communicates with geocode system 1702 to retrieve location information. In one embodiment, data system 1710 is a system for providing geographic information (e.g. a mapping service, a route planning service, etc.) A request from a user is transmitted from client 1712 to data system 1710. The request can be any type of request, such as a request for location information with respect to a point on a map of an area or geographic location or a request for directions from one location to another. The request, in one embodiment, is received by data system 1710 which then transmits one or more location coordinates to geocode system 1702. In response to the location coordinates, geocode system 1702 transmits location information to data system 1710. The location information, in one embodiment, is generated by geocode system 100 of FIG. 1 using the method depicted in FIG. 13. The location information from geocode system 1702 is then used by data system 1710 to generate a response to the user request. For example, the response can be location information pertaining to a point on a map selected by the user. The response may also be direction from a first point to a second point determined by data system 1710 based on the location information received from geocode system 1702. Data system 1710 may also request additional location information in order to identify additional information with respect to the location information. For example, data system 1710 planning a route for a user to traverse can provide additional information such as the location of gas stations along a route from a first location to a second location. Other information such as landmarks near the starting and ending locations of a route or at locations along the route may be determined and provided to the user.

Data system can be other types of system such as a banking systems, retail systems (e.g., systems associated with retailers or other merchandizers), and shipping systems (e.g., FedEx, UPS, or USPS), etc. Such systems can use location information for a variety of different purposes such as security or providing users with a variety of information. For example, a bank may determine a user's location based on location coordinates received from client 1712 which can then be converted to location information using geocode system 1702. The bank can use the location information to determine if a requested transaction should be denied or require additional authentication from a user to proceed. For example, if a first transaction occurs in New York City and a second transaction is requested in San Francisco ten minutes later, the bank may deny the request for the second transaction or request additional authentication from a user in response to the significant difference in the locations of the transactions occurring within a short period of time.

In one embodiment, data system 1710 or messaging system 1708 may determine location information using a variety of data. For example, messaging system 1708 may not receive location coordinates from client 1706. An IP address associated with client device 1706 may be used by messaging system 1708 to determine location coordinates associated with the IP address. The location coordinates associated with the IP address can be transmitted to geocoder system 1702 to determine location information with respect to the IP address. Additional information can then be provided to client 1706 based on the location information determined using the IP address.

Data system 1710, in one embodiment, can be a system for tracking the location and movement of a variety of devices. For example, cell phones lacking GPS receivers can determine their location coordinates based on signals from nearby cell towers. The location coordinates determined by the cell phone can be used by geocode system 1702 to generation location information. In one embodiment, data system 1710 can be a system in communication with a variety of devices. For example, data system 1710 can be in communication with vehicle systems (e.g., vehicle navigation systems, OnStar, satellite radio, etc.). Location information for a vehicle can be determine using geocode system 1702 based on location coordinates provided by the vehicle systems. The location information of the vehicles can then be analyzed to provide a variety of additional information such as traffic and road use.

Figure 18:
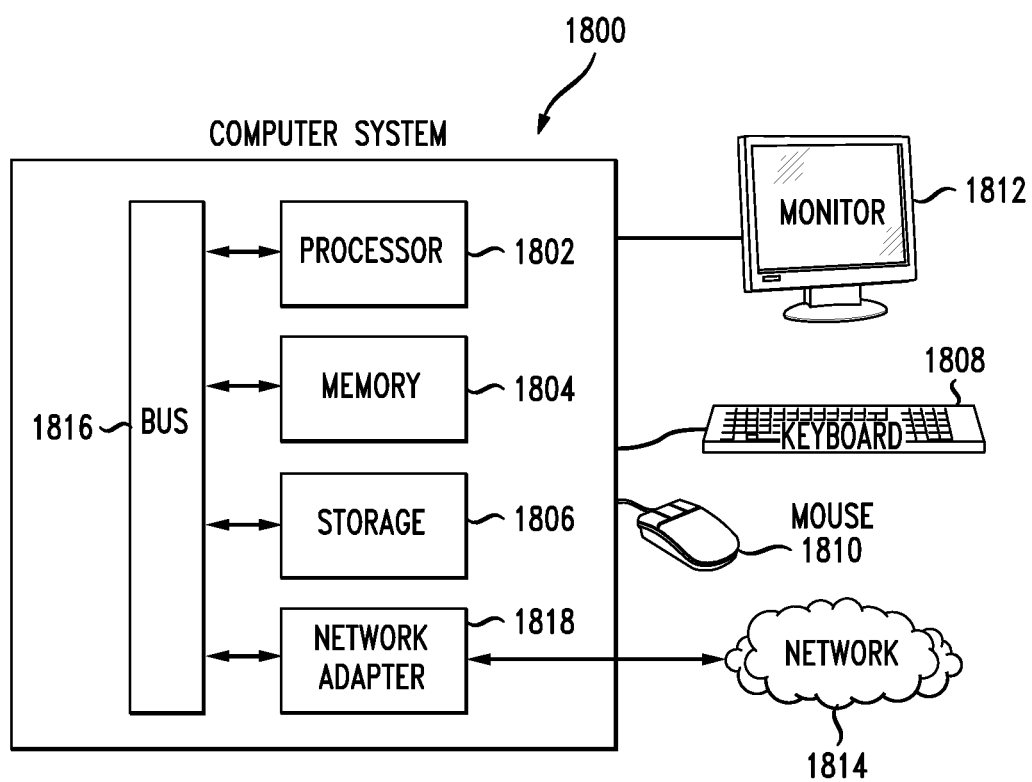
FIG. 18 shows a computer system, in accordance with one or more embodiments of the invention.

Embodiments of the invention may be implemented on virtually any type of computer regardless of the platform being used. For example, as shown in FIG. 18, a computer system (1800) includes one or more processor(s) (1802) (such as a central processing unit (CPU), integrated circuit, hardware processor, etc.), associated memory (1804) (e.g., RAM, cache memory, flash memory, etc.), a storage device (1806) (e.g., a hard disk, an optical drive such as a compact disk drive or digital video disk (DVD) drive, a flash memory stick, etc.), a network adapter (1818), and numerous other elements and functionalities typical of today's computers (not shown). One or more components of the computer system (1800) may be communicatively connected by a bus (1816). The computer system (1800) may also include input means, such as a keyboard (1808), a mouse (1810), or a microphone (not shown). Further, the computer system (1800) may include output means, such as a monitor (1812) (e.g., a liquid crystal display (LCD), a plasma display, or cathode ray tube (CRT) monitor). The computer system (1800) may be connected to a network (1814) (e.g., a local area network (LAN), a wide area network (WAN) such as the Internet, or any other type of network) via the network adapter (1818). Those skilled in the art will appreciate that many different types of computer systems exist, and the aforementioned input and output means may take other forms. Generally speaking, the computer system (1800) includes at least the minimal processing, input, and/or output means necessary to practice embodiments of the invention. Further, in one or more embodiments of the invention, one or more elements of the aforementioned computer system (1800) may be located at a remote location and connected to the other elements over a network. Further, embodiments of the invention may be implemented on a distributed system having a plurality of nodes, where each portion of the invention (e.g., geocode analysis module (145), geocode lookup engine (150), geocode repository (115), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described systems (e.g., geocode analysis module (145), geocode lookup engine (150), geocode repository (115), etc. of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIGS. 12 and 13), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While various embodiments have been described and/or illustrated wherein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

One or more embodiments of the invention have one or more of the following advantages. By creating a set of variably sized tiles defined by a hash value, and by using the tiles to represent a set of overlapping geometries, it may be possible to generate a geocode trie structure enabling fast and efficient reverse geocode lookups. Furthermore, by traversing the geocode trie structure using a geohash value depicting one or more location coordinates, it may be possible to avoid the "point-in-polygon" problem when performing reverse geocode lookups.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A system, comprising:
a messaging system to which messages may be posted by messaging system users, the messaging system being configured to receive a request for messages from a computer device, the request for messages requesting the messaging system to provide messages to the computer device based at least in part on a location corresponding to location coordinates included in the request for messages; and
a geocode system comprising a processor configured to:
receive a reverse geocode lookup request including the location coordinates included in the request for messages;
generate a geohash value based at least on the location coordinates;
traverse a geocode trie structure based on the geohash value, the geocode trie structure representing a set of variably sized tiles representing a set of overlapping geometries of a geographic area and a size of each of the set of variably sized tiles being based on a density index for each tile of the set of variably sized tiles;
identify a most granular tile of the geocode trie structure matching the geohash value; and
control providing, to the messaging system, location information based on the identified most granular tile,
wherein the messaging system is configured to identify messages based on the request for messages and the location information provided by the geocode lookup system and provide the identified messages to the computer device.

2. The system of claim 1, wherein the geocode trie structure comprises:
a plurality of nodes, each particular node representing a particular geohash value associated with a particular tile of the geocode trie structure.

3. The system of claim 1, wherein the density index for each of the set of variably sized tiles is based on a number of users requesting location coordinates in a geographic area represented by the tile.

4. The system of claim 1, wherein a length of particular geohash value is inversely related to a size of a tile associated with the particular geohash value.

5. The system of claim 1, wherein the geohash value is a base 32 representation of the location coordinates interleaved.

6. The system of claim 1, wherein the identifier of the most granular tile comprises a text description of a location associated with the most granular tile.

7. The system of claim 1, wherein the request for the plurality of messages comprises a request for messages from accounts a user has identified as being accounts from which the user wants to receive messages.

8. A system, comprising:
a geocode system comprising a processor configured to:
receive a reverse geocode lookup request identifying a location coordinate;
generate a geohash value based at least on the location coordinate;
traverse a geocode trie structure based on the geohash value, the geocode trie structure representing a set of variably sized tiles representing a set of overlapping geometries of a geographic area and a size of each of the set of variably sized tiles being based on a density index for each tile of the set of variably sized tiles;
identify a most granular tile of the geocode trie structure matching the geohash value; and
provide an identifier of the most granular tile in response to the request; and
a data system in communication with the geocode system, the data system configured to receive the reverse geocode lookup request from a client device, the reverse geocode lookup request from the client device including the location coordinate, and transmit the reverse geocode lookup request to the geocode system,
wherein the data system is a banking system and the data system is configured to:
receive a transaction request from a client device, the transaction request including the location coordinate;
comparing location information based on the identifier of the most granular tile to location information associated with a previous transaction; and
requesting authentication from the client device based on the comparing.

9. A method comprising:
receiving a request for messages from a computer device, the request for messages requesting that messages be provided to the computer device based at least in part on a location corresponding to location coordinates included in the request for messages;
generating a geohash value based at least on the location coordinates;
traversing a geocode trie structure based on the geohash value, the geocode trie structure representing a set of variably sized tiles representing a set of overlapping geometries of a geographic area and a size of each of the set of variably sized tiles being based on a density index for each tile of the set of variably sized tiles;
identifying a most granular tile of the geocode trie structure matching the geohash value;
identifying location information based on the identified most granular tile of the geocode trie structure;
identifying messages based on the request for messages and the location information; and
providing the identified messages to the computer device.

10. The method of claim 9, wherein the geocode trie structure comprises a plurality of nodes, each of the plurality of nodes representing a geohash value.

11. The method of claim 9, wherein the density index for each tile of the set of variably sized tiles comprises a user density index representing a frequency of requests from user devices from a geographic area represented by the tile.

12. The method of claim 9, wherein the user density index for each of the set of variably sized tiles is based on a number of users requesting location coordinates in a geographic area represented by the tile.

13. The method of claim 9, wherein a length of each geohash value is inversely related to a size of the tile associated with the geohash value.

14. A non-volatile computer-readable storage medium storing instructions which, when executed, cause a computer to perform operations comprising:
receiving a request for messages from a computer device, the request for messages requesting that messages be provided to the computer device based at least in part on a location corresponding to location coordinates included in the request for messages;
generating a geohash value based at least on the location coordinates;
traversing a geocode trie structure based on the geohash value, the geocode trie structure representing a set of variably sized tiles representing a set of overlapping geometries of a geographic area and a size of each of the set of variably sized tiles being based on a density index for each tile of the set of variably sized tiles;
identifying a most granular tile of the geocode trie structure matching the geohash value;
identifying location information based on the identified most granular tile of the geocode trie structure;
identifying messages based on the request for messages and the location information; and
providing the identified messages to the computer device.

15. The non-volatile computer-readable storage medium of claim 14, wherein the geocode trie structure comprises a plurality of nodes, each of the plurality of nodes representing a geohash value.

16. The non-volatile computer-readable storage medium of claim 14, wherein the set of density indices comprises:
a set of user density indices each representing a frequency of requests from user devices in at least a portion of the geographic area.

17. The non-volatile computer-readable storage medium of claim 14, wherein the user density index for each of the set of variably sized tiles is based on a number of users requesting location coordinates in a geographic area represented by the tile.

18. The non-volatile computer-readable storage medium of claim 14, wherein a length of each geohash value is inversely related to a size of the tile associated with the geohash value.

19. The method according to claim 14, wherein the set of density indices comprises a set of user density indices each representing a frequency of requests from user devices in at least a portion of the geographic area.

* * * * *